(12) United States Patent
Hu (10) Patent No.: US 10,434,961 B2
(45) Date of Patent: Oct. 8, 2019

(54) ADJUSTABLE LICENSE PLATE BRACKETS

(71) Applicant: Ford Global Technologies LLC, Dearborn, MI (US)

(72) Inventor: Scott Hu, Greensborough (AU)

(73) Assignee: Ford Global Technologies LLC, Dearborn, MI (US)

( * ) Notice: Subject to any disclaimer, the term of this patent is extended or adjusted under 35 U.S.C. 154(b) by 98 days.

(21) Appl. No.: 15/882,884

(22) Filed: Jan. 29, 2018

(65) Prior Publication Data
US 2018/0244217 A1    Aug. 30, 2018

(30) Foreign Application Priority Data

Feb. 27, 2017    (CN) .......................... 2017 1 0108022

(51) Int. Cl.
*B60R 13/10*        (2006.01)
*G09F 7/18*         (2006.01)

(52) U.S. Cl.
CPC .............. *B60R 13/105* (2013.01); *G09F 7/18* (2013.01); *G09F 2007/1865* (2013.01); *G09F 2007/1895* (2013.01)

(58) Field of Classification Search
None
See application file for complete search history.

(56) References Cited

U.S. PATENT DOCUMENTS

| | | | | |
|---|---|---|---|---|
| 1,488,098 A | * | 3/1924 | Critharis | B60Q 1/56 40/204 |
| 2,106,015 A | | 1/1938 | Polster | |
| 2,162,634 A | * | 6/1939 | Paine | B60R 13/105 248/316.4 |
| 2,185,084 A | * | 12/1939 | Hutaff, Jr. | B60R 13/105 248/316.5 |
| 2,185,085 A | * | 12/1939 | Hutaff, Jr. | B60R 13/105 248/316.5 |
| 2,244,867 A | * | 6/1941 | Buchanan | B60R 13/105 248/475.1 |
| 2,481,437 A | * | 9/1949 | Miller | B60R 13/10 248/201 |

(Continued)

FOREIGN PATENT DOCUMENTS

| | | |
|---|---|---|
| CN | 105235611 A | 1/2016 |
| CN | 205395973 U1 | 7/2016 |
| EP | 0706913 B1 | 6/1996 |

*Primary Examiner* — Kristina N Junge
(74) *Attorney, Agent, or Firm* — Vichit Chea; Kolitch Romano LLP (57) ABSTRACT

Adjustable license plate brackets for vehicles comprising a first bracket element that is secured to a vehicle; a second bracket element having an upper end to be connected to a license plate and a lower end disposed upon the first end of the first bracket element; and a third bracket element having an upper end to be connected to a license plate and a lower end disposed upon the second end of the first bracket element. The second bracket element and the third bracket element are configured to be connected to the first bracket element at a plurality of positions, implemented using an elongated aperture with a plurality of notches into which a bracket element connector can be inserted, respective so that a distance between the upper ends of the second and the third bracket elements varies to accommodate license plates with different sizes.

10 Claims, 5 Drawing Sheets

(56) References Cited

U.S. PATENT DOCUMENTS

| | | | |
|---|---|---|---|
| 2,916,842 A * | 12/1959 | Mushynski | ........... B60R 13/105 40/202 |
| 6,772,545 B2 | 8/2004 | Hashim et al. | |
| 7,152,352 B2 | 12/2006 | Rossello et al. | |
| 2016/0221516 A1 | 8/2016 | Martin | |

* cited by examiner

ADJUSTABLE LICENSE PLATE BRACKETS

RELATED APPLICATION

This application claims the benefit of Chinese Patent Application No.: CN 201710108022.3 filed on Feb. 27, 2017, the entire contents thereof being incorporated herein by reference.

FIELD

The present disclosure relates generally to accessories for mounting license plates and tags to vehicles. In particular, license plate brackets that are adjustable to accommodate a variety of different license plate/tag sizes are described.

BACKGROUND

Vehicles may be manufactured for export to a variety of countries. Virtually all countries in the world impose vehicle licensing requirements, including the placement of a government-issued registration tag upon a licensed vehicle, commonly referred to as a license plate. License plates are typically attached to the rear ends of vehicles, usually on relatively broad, flat surface such as a specifically designated place on the vehicle's bumper, just above the bumper on a rear panel, or on or just below the trunk or boot lid. Vehicles commonly are equipped with a plain, broad, flat surface specifically sized to accommodate differing license plates from various jurisdictions. License plates are commonly affixed to vehicles using several screws or bolts.

One approach that is commonly used is to supply an intermediate adapter bracket. The adapter bracket attaches to a series of holes in the vehicle drilled at predetermined locations, and in turn is sized to accept plates from a specific jurisdiction. However, different sizes of the adapter bracket will need to be made for the vehicles in different jurisdiction, which increases manufacturing costs such as the need for different tooling.

U.S. Pat. No. 6,772,545 to Hashim et al. discloses a universal license plate holder that can be adjusted to accommodate license plates of various sizes. The holder is comprised of a pair of attachment brackets that are in turn connected together with a cross-bar. Each attachment bracket is secured to a vehicle via a mounting fastener which, when loose, forms a pivot point for its respective attachment bracket. The cross-bar likewise is attached to each attachment bracket at a pivot point, and so rotation of one bracket causes to other bracket to likewise rotate, with the cross-bar keeping each bracket in an appropriate relative position to the other bracket to accommodate various sizes of license plates. Spacing for a given license plate is accomplished by rotating the brackets. However, the inventor has recognized that the license plate holder does not have preset positions for different license plates and thus a user needs to rotate the brackets or the cross-bar to find a position to fit his/her license plate, which can be time consuming and even difficult to find the best position for the license plate.

SUMMARY

The present disclosure is directed to adjustable license plate brackets for vehicles. According to a first aspect of the disclosed invention, an adjustable license plate bracket for a vehicle comprises a first bracket element possessing a first end and a second end distal from the first end, the first bracket element being secured to the vehicle; a second bracket element having an upper end to be connected to a license plate and a lower end disposed upon the first end of the first bracket element; and a third bracket element having an upper end to be connected to a license plate and a lower end disposed upon the second end of the first bracket element. The second bracket element and the third bracket element are configured to be connected to the first bracket element at a plurality of positions, respective so that a distance between the upper ends of the second and the third bracket elements varies to accommodate license plates with different sizes.

In one embodiment, the first bracket element, second bracket element, and third bracket element are arranged so as to be hidden by a license plate when the license plate is secured to the bracket.

In another embodiment, the second and third bracket elements each further comprise a first section and a second section, wherein the first section is arranged perpendicular to the second section such that the second and third bracket elements are shaped substantially like an "L"; the first section is configured to receive one of the plurality of bracket connectors; the second section is configured to receive the portion of a license plate; and moving the second bracket element with respect to the third bracket element changes the distance between the second sections of the second bracket element and third bracket element.

In another embodiment, the second sections of the second and third bracket elements are arranged substantially parallel to each other when the second and third bracket elements are secured to the first bracket element.

In yet another embodiment, the lower end of the second bracket element includes a first elongated aperture having a plurality of notches and the lower end of the third bracket element includes a second elongated aperture having a plurality of notches, wherein the second bracket element is secured to the first bracket element via a connector passing through one of the notches in the first elongated aperture and a corresponding hole in the first bracket element, and the third bracket element is secured to the first bracket element via a connector passing through one of the notches in the second elongated aperture.

In another embodiment, each elongated aperture has a long axis and further comprises a plurality of notches disposed orthogonally from the long axis, each notch configured to receive and engage the elongated aperture's corresponding bracket connector, and the placement and number of plurality of notches is identical for each elongated aperture. Each notch is positioned with respect to its elongated aperture such that moving the second and third bracket elements so that the corresponding bracket connector for each of the second and third bracket elements engages one of the plurality of notches of the corresponding elongated aperture results in the second and third bracket elements being spaced a predetermined distance to allow one of a set of license plates of at least two different sizes to be secured to the bracket.

In still another embodiment, the first end of the first bracket element includes a first elongated aperture having a plurality of notches and the second end of the first bracket element includes a second elongated aperture having a plurality of notches, wherein the second bracket element is secured to the first bracket element via a connector passing through one of the notches in the first elongated aperture and a corresponding hole in the first bracket element and the third bracket element is secured to the first bracket element via a connector passing through one of the notches in the second elongated aperture.

In another embodiment, the first end and second end of the first bracket element each further comprise an elongated aperture; each of the plurality of bracket connectors is secured to its corresponding second or third bracket element in a fixed location; each of the plurality of bracket connectors secures its corresponding second or third bracket element to the first bracket element by passing through the elongated aperture of its corresponding first end or second end; and the second and third bracket elements are moveable with respect to each other by the second and third bracket elements each sliding with respect to the first bracket element such that the position of the second and third bracket elements' corresponding bracket connector is shifted within its corresponding elongated aperture on the first bracket element.

In still another embodiment, each elongated aperture has a long axis, and further comprises a plurality of notches disposed orthogonally from the long axis, each notch configured to receive and engage the elongated aperture's corresponding bracket connector, and wherein the placement and number of plurality of notches is identical for each elongated aperture, and each notch is positioned with respect to its elongated aperture such that moving the second and third bracket elements, so that the corresponding bracket connector for each of the second and third bracket elements engages one of the plurality of notches of the corresponding elongated aperture, results in the second and third bracket elements being spaced a predetermined distance to allow one of a set of license plates of at least two different sizes to be secured to the bracket.

According to a second aspect of the disclosed invention, an adjustable license plate bracket for attaching one of a license plate of at least two different sizes of license plates to a vehicle comprises a transverse bracket member with a first end and a second end, the transverse bracket member being affixed to an exterior surface of the vehicle; and two vertical bracket members, wherein each of the two vertical bracket members is affixed to the first end and second end, respectively, of the transverse bracket member with a corresponding bracket member connector. Each bracket member connector secures its corresponding vertical bracket member to the transverse bracket member through a corresponding elongated aperture, the two vertical bracket members are configured to allow the license plate to be secured, and each of the two vertical bracket members is moveable with respect to the transverse bracket member and the other vertical bracket member so as to accommodate each of the license plates of at least two different sizes to the bracket.

In one embodiment, each corresponding elongated aperture is located within the transverse bracket member, and each bracket member connector is secured to its corresponding vertical bracket member in a fixed location.

In another embodiment, each corresponding elongated aperture possesses a long axis, and further comprises a plurality of notches that extend orthogonally from the long axis, and each of the plurality of notches is sized to receive a portion of its corresponding bracket member connector.

In yet another embodiment, placing the bracket member connector for each corresponding vertical bracket member into one of the plurality of notches in its corresponding elongated aperture spaces the two vertical bracket members so as to allow one of the license plates of at least two different sizes to be secured to the bracket.

According to a third aspect of the disclosed invention, an adjustable license plate bracket that is secured to a vehicle and configured to accommodate a license plate selected from license plates of at least two different sizes comprises a transverse bracket member that is secured to the vehicle, the transverse bracket member further comprising a first end and a second end; a first bracket member connector affixed to the first end; a first vertical bracket member further comprising a transverse end and a vertical end that is disposed orthogonally from the transverse end of the first vertical bracket member, the transverse end of the first vertical bracket member possessing an elongated aperture through which the first bracket member connector passes so as to movably affix the first vertical bracket member to the transverse bracket member; a second bracket member connector affixed to the second end; and a second vertical bracket member further comprising a transverse end and a vertical end that is disposed orthogonally from the transverse end of the second vertical bracket member, the transverse end of the second vertical bracket member possessing an elongated aperture through which the second bracket member connector passes so as to movably affix the second vertical bracket member to the transverse bracket member. The first vertical bracket member and second vertical bracket member can slide with respect to each other and the transverse bracket member such that the position of the first bracket member connector and second bracket member connector within their respective elongated channels changes, the vertical ends of the first vertical bracket member and second vertical bracket member are configured to receive and secure the license plate, and sliding the first vertical bracket member and second vertical bracket member with respect to each other allows the bracket to accommodate a second license plate of a different size than the license plate.

In one embodiment, each elongated aperture possesses a long axis, and further comprises a plurality of notches that extend orthogonally from the long axis, and each of the plurality of notches is sized to receive a portion of its corresponding bracket member connector.

In another embodiment, moving the first vertical bracket member and second vertical bracket member so that each of the first bracket member connector and second bracket member connector are placed into one of the plurality of notches in its corresponding elongated aperture spaces the first vertical bracket member and second vertical bracket member to the size of the second license plate.

In another embodiment, the bracket is sized so that it is completely covered when the license plate or second license plate is mounted to the bracket.

In another embodiment, the transverse bracket member further includes an aperture that engages a corresponding pin upon the vehicle so as to positively locate the bracket upon the vehicle.

In yet another embodiment, the license plate is secured to the vertical ends of the first vertical bracket member and second vertical bracket member by a hole located in each of the vertical ends.

In still another embodiment, the first bracket member connector and second bracket member connector are each substantially cylindrical in shape, with a retaining flange being located on one end of the substantially cylindrical shape that is sized so that the first bracket member connector and second bracket member connector are each retained within their respective elongated apertures.

DETAILED DESCRIPTION

The disclosed adjustable license plate brackets will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various adjustable license plate brackets are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1A-5C, an example of an adjustable license plate bracket, bracket 100, will now be described. Bracket 100 functions to provide a lightweight license plate bracket that securely attaches a license plate to a vehicle, while also being adjustable to accommodate different size license plates that may be issued by various jurisdictions. The reader will appreciate from the figures and description below that bracket 100 addresses shortcomings of conventional license plate brackets.

For example, bracket 100 provides two mounting points to attach each side of a license plate when bracket 100 is secured to a vehicle. These mounting points are located on arms that are adjustable for width thereby allowing a variety of license plates, which are typically rectangular in size but can vary in width, to be accommodated without having to change brackets. Further, bracket 100 is compact in profile, and so allows most license plates to cover the entire bracket, thereby providing a clean appearance. As will be described below, the adjustment means of bracket 100 may include a plurality of notches to enable bracket 100 to be easily adjusted to predetermined sizes, to aid swapping of different size license plates.

Figure 1A:
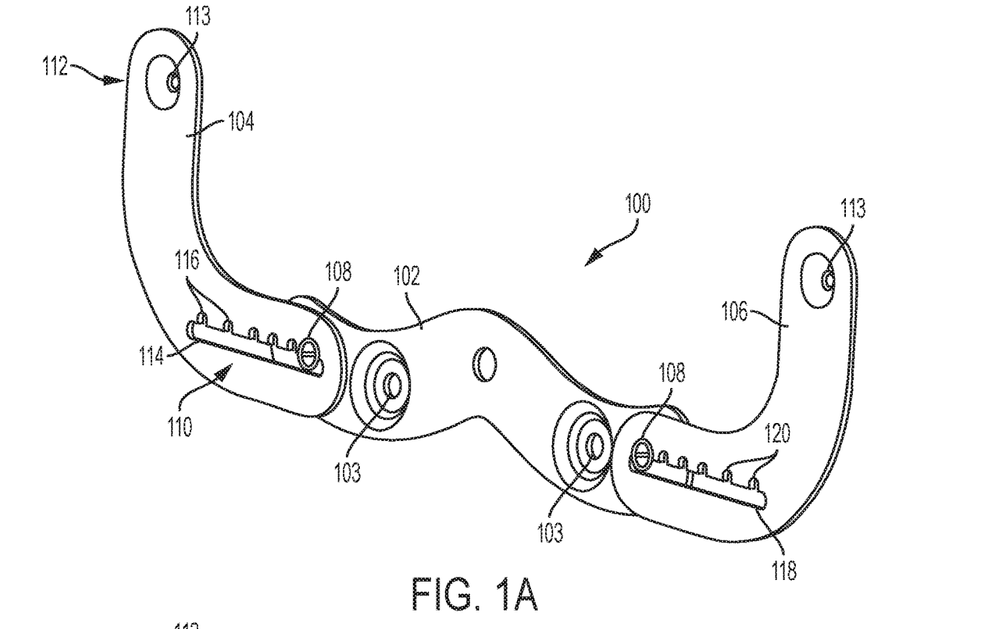
FIG. 1A is a perspective view of an example of an adjustable license plate bracket as disclosed herein.
Figure 1B:
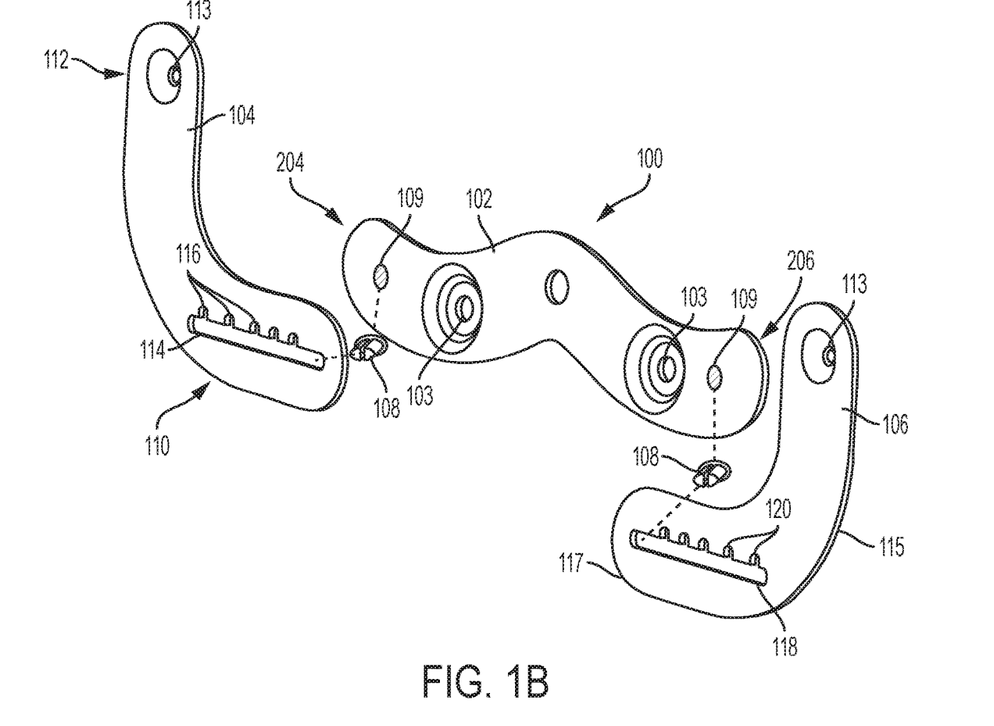
FIG. 1B is an exploded view of the example adjustable license plate bracket of FIG. 1A depicting how the various components are arranged.

With reference to FIGS. 1A and 1B, bracket 100 includes a first bracket element 102, sometimes referred to in the claims as a transverse bracket member, possessing a first end 204 and a second end 206 distal from first end 204, a second bracket element 104 having an upper end 112 to be connected to a license plate and a lower end 110 disposed upon first end 204 of first bracket element 102, and a third bracket element 106 having an upper end 115 to be connected to a license plate and a lower end 117 disposed upon the second end 206 of first bracket element 102. Second bracket element 104 and third bracket element 106 are configured to be connected to first bracket element 102 at a plurality of positions, respectively, so that a distance between the upper ends of the second and the third bracket elements varies to accommodate license plates with different sizes. In some embodiments, second bracket element 104 and the third bracket element 106 may be symmetrical to a line passing through a center of first bracket element 102.

Figure 2:
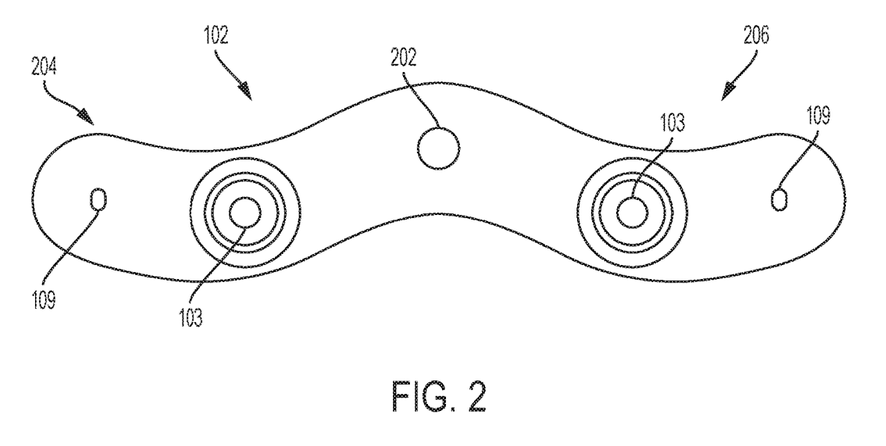
FIG. 2 is a front view of the first bracket member that is part of the adjustable license plate bracket shown in FIGS. 1A and 1B.

As can be seen in FIG. 2, in addition to first end 204 and second end 206, first bracket element 102 includes one or more mounting holes 103, a centering hole 202, and bracket connector holes 109. Mounting holes 103 are used to immovably secure first bracket element 102 to a vehicle surface. A centering hole 202, may be included to fit a corresponding centering pin that may be provided on some vehicles, allowing mounting holes 103 to be lined up to their appropriate locations for attachment, and to optimally center bracket 100 upon the vehicle surface. Connector holes 109 each receive a bracket connector 108, which allows for attachment of second bracket element 104 and third bracket element 106 to first end 204 and second end 206, respectively.

In the preferred embodiment depicted in FIG. 2, first bracket element 102 is in the shape of a substantially flattened "W". However, it should be understood that first bracket element 102 could be shaped in a variety of different configurations without departing from the disclosed invention. First bracket element 102 is preferably made from stamped metal, plastic, composites, or any other suitable material or combination of materials now known or later developed. The various holes depicted on first bracket element 102, including mounting holes 103, connector holes 109, and centering hole 202, although pictured as circular, could be any appropriate shape and/or configuration suitable to the fasteners used. Furthermore, although only one centering hole 202 is depicted, it should be understood that any number of centering holes in various locations upon first bracket element 102 could be implemented.

Figure 3:
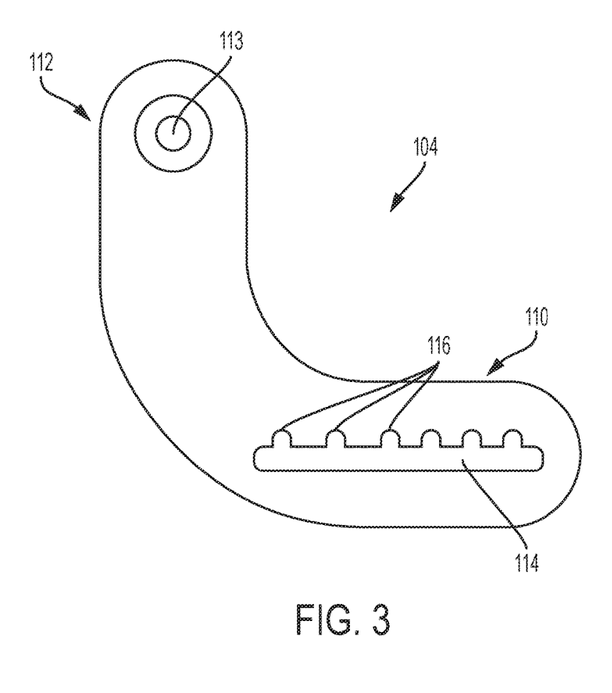
FIG. 3 is a front view of a bracket member that is part of the adjustable license plate bracket shown in FIGS. 1A and 1B, that constitutes the second and third bracket members.

Turning to FIG. 3, second bracket element 104 is depicted, also referred to in the claims as a vertical bracket member. As described above, second bracket element 104 includes upper end 112 and lower end 110. Upper end 112 further includes plate mounting hole 113, which is sized to receive a screw or bolt used to mount a license plate to bracket 100. Lower end 110, which is disposed 90 degrees from upper end 112, includes an elongated aperture 114, from one side of which are cut in an orthogonal fashion one or more notches 116 at predetermined distances. As will be described in greater detail below, these predetermined distances preferably correspond to known sizes of various different license plates.

Third bracket element 106, although not individually depicted in the figures, is a mirror image of second bracket element 104, and is otherwise preferably configured identically, with identically corresponding features to mounting hole 113, elongated aperture 114 and notches 116. Both second bracket element 104 and third bracket element 106 are manufactured from similar materials as first bracket element 102, such as stamped metal, plastic, composites, or any suitable material or combination of materials now known or later developed. Furthermore, although both second and third bracket elements 104 and 106 are depicted in a "L" configuration, this should not be understood as limiting. Second and third bracket elements 104 and 106 could be configured to have two vertical ends, with a mounting hole 113 placed upon each end to present four mounting holes for license plates.

Figure 4:
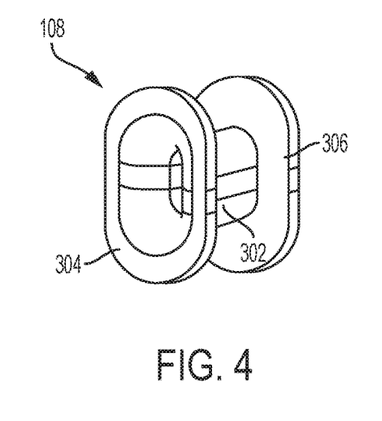
FIG. 4 is a front view of a bracket member connector that is part of the adjustable license plate bracket shown in FIGS. 1A and 1B.

In the example shown in FIG. 4, bracket connector 108 is shown, and includes a central portion 302 that is flanked by first flange 304 and second flange 306. One bracket connector 108 passes through each elongated aperture 114 and connector hole 109, thereby attaching second bracket element 104 and third bracket element 106 to first bracket element 102. Each bracket connector 108 is retained between elongated aperture 114 and connector hole 109 by first flange 304 and second flange 306. One flange sits atop second/third bracket elements 104 and 106, while the other flange sits below first bracket element 102. As first flange 304 and second flange 306 are preferably sized larger than the width of elongated aperture 114 and included notches 116, as well as the diameter of connector hole 109, bracket 100 is thereby held together and is able to securely attach license plates to the vehicle.

Further, central portion 302 of each bracket connector 108 is sized to fit closely into each notch 116, while still being sized so as to be able to slide across the length of elongated aperture 114 when removed from a notch 116. Thus, second/third bracket elements 104 and 106 are allowed to be slid with respect to first bracket element 102. In normal use, second and third bracket elements 104 and 106 are locked into a fixed position by sliding each bracket element until its respective bracket connector 108 is positioned adjacent to a desired notch 116, then sliding the bracket element down so that bracket connector 108 engages into the desired notch 116, thereby holding the bracket element at the predetermined distance determined by the desired notch 116. If a different notch 116 is subsequently desired, the bracket element is merely lifted up to disengage bracket connector 108 from notch 116, and then the bracket element is slid to reposition bracket connector 108 over the new desired notch 116.

Each bracket connector 108 is preferably constructed from metal, composites, plastic or another suitably durable material that can withstand the forces imposed by the bracket 100 when second and third bracket elements 104 and 106 are secured via engagement with a notch 116. Further, although bracket connector 108 has a specific configuration as depicted in FIG. 4, a person skilled in the relevant art should understand that bracket connector 108 could be configured in a variety of fashions while not departing from the disclosed invention. For example, the cross section of central portion 302 is shown as substantially ovoid; however, a square, circular, or polygonal cross section could be used. Furthermore, in some implementations bracket connector 108 could be comprised of conventional hardware, such as a bolt or screw.

Figure 5A:
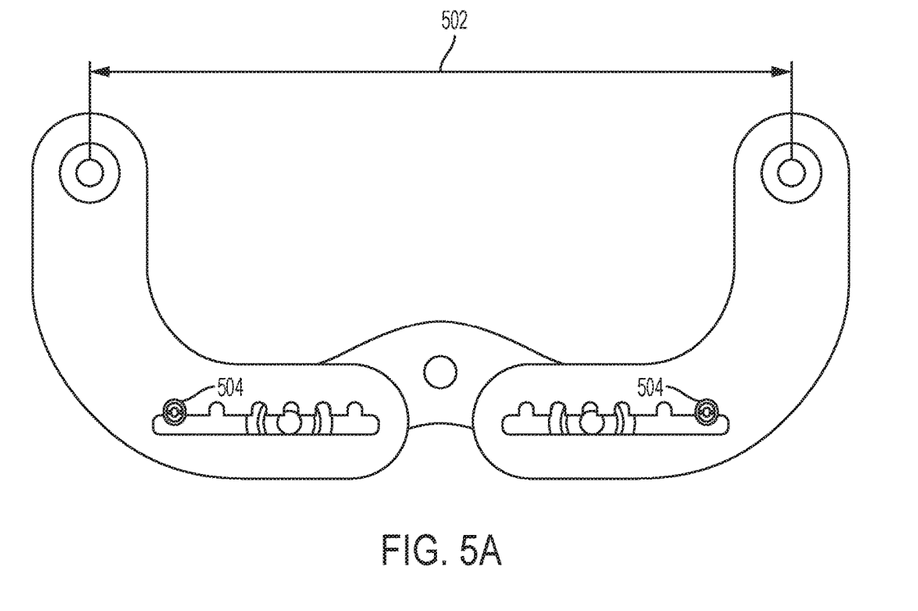
FIG. 5A is a front view of the example adjustable license plate bracket shown in FIGS. 1A and 1B depicting the bracket configured with a narrow distance between the second and third bracket members.
Figure 5B:
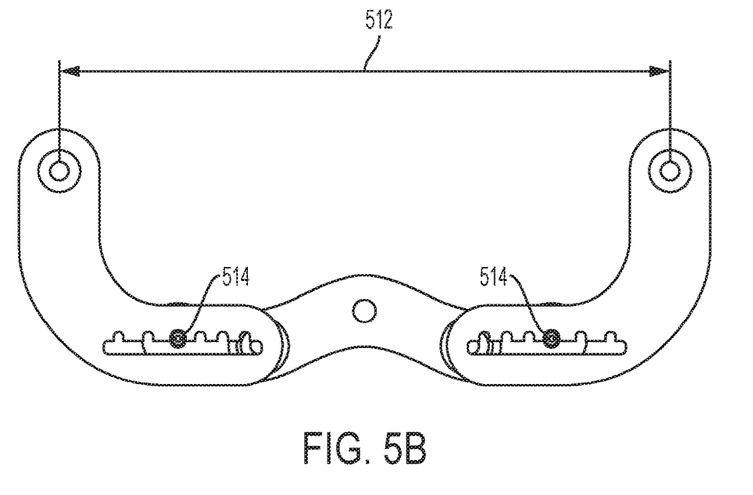
FIG. 5B is a front view of the example adjustable license plate bracket shown in FIGS. 1A and 1B depicting the bracket configured with a medium distance between the second and third bracket members.
Figure 5C:
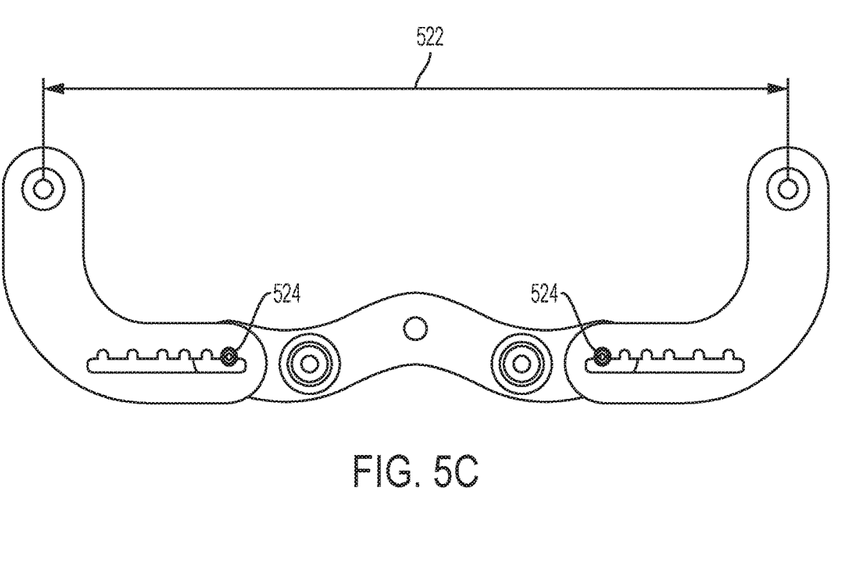
FIG. 5C is a front view of the example adjustable license plate bracket shown in FIGS. 1A and 1B depicting the bracket configured with a wide distance between the second and third bracket members.

FIGS. 5A through 5C depict bracket 100 with second and third bracket elements 104 and 106 secured to various distances as would be used with various license plates of different sizes. In FIG. 5A, second bracket element 104 and third bracket element 106 are set so that the plate mounting holes 113 are set apart a distance 502 of 170 mm. This is accomplished by placing the bracket connectors 108 each into the outermost notch 116 of each elongated aperture 114, which is the notch 116 that is closest to each bracket element's first end 112 and 115. It should be understood that this distance of 170 mm (and the other distances listed below with respect to FIGS. 5B and 5C) are given for explanatory and exemplary purposes only, and are not intended to be limiting or even preferred.

FIG. 5B depicts second bracket element 104 and third bracket element 106 set so that mounting holes 113 are a medium distance 512 of 210 mm apart. This is accomplished by selecting a middle position notch 116 in each elongated aperture 114.

Finally, FIG. 5C depicts second bracket element 104 and third bracket element 106 set so that mounting holes 113 are a wide distance 522 of 255 mm apart, accomplished by selecting notches 116 in each elongated aperture 114 that are closest to the second end 114 and 117 of each second/third bracket element.

Although bracket 100 is depicted with an elongated aperture 114 that possesses notches 116, it should be appreciated that variations on this mechanism for setting the distance between mounting holes 113 may be implemented without departing from the disclosed invention. For example, second bracket element may include a plurality of location holes at predetermined distances along a length of lower end 110. Similarly, third bracket element may include a plurality of holes along its lower end. One pair of holes in the second and third bracket elements correspond to a distance to make the bracket adapted to a known size of license plate. In another example, notches 116 could be omitted entirely, with the distance between mounting holes 113 locked in place via a friction or pressure fit from a bracket connector 108 that is implemented as a screw or other mechanism that is tightened so as to use friction for a lock.

Figure 6:
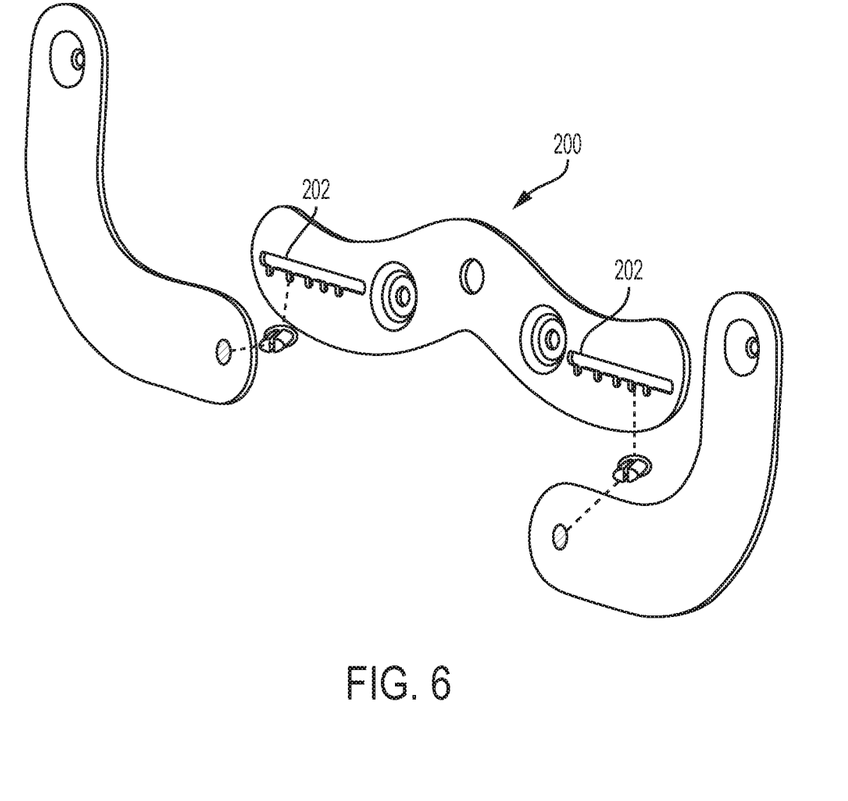
FIG. 6 is a front view of another embodiment of a first bracket member according to the present disclosure.

Furthermore, the positions of elongated aperture 114 and connector hole 109 could be swapped, for example, first bracket element 102 could be implemented with two elongated apertures 114, one located on first end 204, and one located on second end 206, and second and third bracket elements 104 and 106 would include only a connector hole 109 each located on second ends 114 and 117. FIG. 6 shows this configuration, with a first bracket element 200 according to another embodiment of the present disclosure. First bracket element 200 includes a plurality of elongated apertures 202, each of which correspond to elongated aperture 114 on second and third bracket elements 104 and 106 of the embodiment illustrated in FIGS. 1A and 1B.

While bracket 100 is depicted with second and third bracket elements 104 and 106 generally extending upward from first bracket element 102, it should be further appreciated that bracket 100 could be flipped, with the first ends 112 and 115 extending downward from first bracket element 102.

It should be appreciated that bracket 100 may be sized and profiled so that regardless of which plate size is mounted to bracket 100, bracket 100 is hidden by the mounted plate.

The bracket of the present disclosure can adapt to different sizes of license plate. As a plurality of positions for specific size of the license plate are available, it is easier for the users to find the correct position to install their license plates.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An adjustable license plate bracket for a vehicle, comprising:
    a first bracket element possessing a first end and a second end distal from the first end, the first bracket element being secured to the vehicle;
    a second bracket element having an upper end to be connected to a license plate and a lower end disposed upon the first end of the first bracket element; and
    a third bracket element having an upper end to be connected to a license plate and a lower end disposed upon the second end of the first bracket element,
    wherein the second bracket element and the third bracket element are configured to be connected to the first bracket element at a plurality of positions, respectively, so that a distance between the upper ends of the second and the third bracket elements varies to accommodate license plates with different sizes;
    wherein the second and third bracket elements each further comprise a first section and a second section, wherein the first section is arranged perpendicular to the second section such that the second and third bracket elements are shaped substantially like an "L", the first section is configured to receive one of a plurality of bracket connectors; the second section is configured to receive a portion of a license plate;
    wherein the first end of the first bracket element includes a first elongated aperture having a plurality of notches and the second end of the first bracket element includes a second elongated aperture having a plurality of notches, and wherein each elongated aperture has a long axis, and the plurality of notches disposed orthogonally from the long axis;
    wherein the second bracket element is secured to the first bracket element via a bracket connector passing through one of the notches in the first elongated aperture and a corresponding hole in the second bracket element, and the third bracket element is secured to the first bracket element via a bracket connector passing through one of the notches in the second elongated aperture and a corresponding hole in the third bracket element.

2. The adjustable license plate bracket of claim 1, wherein the first bracket element, the second bracket element, and the third bracket element are arranged so as to be hidden by a license plate when the license plate is secured to the bracket.

3. The adjustable license plate bracket of claim 1, wherein the second sections of the second and third bracket elements are arranged substantially parallel to each other when the second and third bracket elements are secured to the first bracket element.

4. The adjustable license plate bracket of claim 1,
    a placement and a number of plurality of notches are identical for each elongated aperture, and
    each notch is positioned with respect to its elongated aperture such that moving the second and third bracket elements, so that the bracket connector for each of the second and third bracket elements engages one of the plurality of notches of the corresponding elongated aperture, results in the second and third bracket elements being spaced a predetermined distance to allow one of a set of license plates of at least two different sizes to be secured to the bracket.

5. An adjustable license plate bracket that is secured to a vehicle and configured to accommodate a license plate selected from license plates of at least two different sizes, comprising:
    a transverse bracket member that is secured to the vehicle, the transverse bracket member further comprising a first end and a second end;
    a first bracket member connector affixed to the first end;
    a first vertical bracket member comprising a transverse end and a vertical end that is disposed orthogonally from the transverse end of the first vertical bracket member, the transverse end of the first vertical bracket member possessing an elongated aperture through which the first bracket member connector passes so as to movably affix the first vertical bracket member to the transverse bracket member;
    a second bracket member connector affixed to the second end; and
    a second vertical bracket member comprising a transverse end and a vertical end that is disposed orthogonally from the transverse end of the second vertical bracket member, the transverse end of the second vertical bracket member possessing an elongated aperture through which the second bracket member connector passes so as to movably affix the second vertical bracket member to the transverse bracket member, and wherein:
        the first vertical bracket member and second vertical bracket member can slide with respect to each other and the transverse bracket member such that positions of the first bracket member connector and the second bracket member connector within their respective elongated channels changes,
        the vertical ends of the first vertical bracket member and the second vertical bracket member are configured to receive and secure the license plate, and
        sliding the first vertical bracket member and the second vertical bracket member with respect to each other allows the bracket to accommodate a second license plate of a different size than the license plate;

wherein each elongated aperture possesses a long axis, and further comprises a plurality of notches that extend orthogonally from the long axis, and each of the plurality of notches is sized to receive a portion of its corresponding bracket member connector.

6. The adjustable license plate bracket of claim 5, wherein moving the first vertical bracket member and the second vertical bracket member so that each of the first bracket member connector and the second bracket member connector are placed into one of the plurality of notches in its corresponding elongated aperture spaces the first vertical bracket member and the second vertical bracket member to the size of the second license plate.

7. The adjustable license plate bracket of claim 6, wherein the bracket is sized so that it is completely covered when the license plate or the second license plate is mounted to the bracket.

8. The adjustable license plate bracket of claim 5, wherein the transverse bracket member further includes an aperture that engages a corresponding pin upon the vehicle so as to positively locate the bracket upon the vehicle.

9. The adjustable license plate bracket of claim 8, wherein the license plate is secured to the vertical ends of the first vertical bracket member and the second vertical bracket member by a hole located in each of the vertical ends.

10. The adjustable license plate bracket of claim 9, wherein the first bracket member connector and the second bracket member connector are each substantially cylindrical in shape, with a retaining flange being located on one end of the substantially cylindrical shape that is sized so that the first bracket member connector and the second bracket member connector are each retained within their respective elongated apertures.

* * * * *